United States Patent
Wodka et al.

(10) Patent No.: US 12,403,506 B2
(45) Date of Patent: Sep. 2, 2025

(54) SYSTEM AND METHODS FOR IDENTIFYING OBJECTS

(71) Applicant: Canpack S.A., Cracow (PL)

(72) Inventors: Dawid Wodka, Cracow (PL); Michal Szydlowski, Cracow (PL)

(73) Assignee: Canpack S.A., Cracow (PL)

( * ) Notice: Subject to any disclaimer, the term of this patent is extended or adjusted under 35 U.S.C. 154(b) by 0 days.

(21) Appl. No.: 18/429,026

(22) Filed: Jan. 31, 2024

(65) Prior Publication Data

US 2024/0261824 A1 Aug. 8, 2024

(30) Foreign Application Priority Data

Feb. 2, 2023 (EP) .................................... 23461508

(51) Int. Cl.
*B07C 5/36* (2006.01)
*B07C 5/34* (2006.01)
*B07C 5/342* (2006.01)

(52) U.S. Cl.
CPC .............. *B07C 5/36* (2013.01); *B07C 5/3404* (2013.01); *B07C 5/3422* (2013.01)

(58) Field of Classification Search
CPC ........ B07C 5/36; B07C 5/3404; B07C 5/3422
See application file for complete search history.

(56) References Cited

U.S. PATENT DOCUMENTS

| | | |
|---|---|---|
| 2,363,079 A | 11/1944 | Omalley |
| 3,512,638 A | 5/1970 | Chengges et al. |
| 4,621,807 A | 11/1986 | Stramer |
| 4,651,879 A | 3/1987 | Harris et al. |
| 11,173,522 B2 | 11/2021 | Martinsen |

(Continued)

FOREIGN PATENT DOCUMENTS

| | | |
|---|---|---|
| DE | 6601375 U | 4/1969 |
| DE | 1611893 A1 | 1/1971 |
| DE | 2701547 A1 | 7/1978 |

OTHER PUBLICATIONS

Application No. EP23461508.6, Extended European Search Report, Mailed On Oct. 31, 2023, 9 pages.

(Continued)

*Primary Examiner* — Jacob S. Scott
*Assistant Examiner* — Miraj T. Patel
(74) *Attorney, Agent, or Firm* — Kilpatrick Townsend & Stockton LLP

(57) ABSTRACT

A system for identifying an object including a conveyer mechanism, a diverting bar, a counterweight, an object collector, an object inspector, and a selection arm. The diverting bar includes a body which may be positioned at least partially over the conveyer mechanism as to divert one or more objects of a plurality of objects traveling on the conveyer mechanism. The counterweight is coupled to the diverting bar and applies a biasing force against the one or more objects as to reduce the force applied to the plurality of objects. The object collector may be positioned adjacent the conveyer mechanism and is configured to accept an object from the conveyer mechanism and inspect the object for at least one marking. Once inspected, the selection arm is configured to deliver the object to a target position or back to the conveyer mechanism based on at least one marking.

14 Claims, 12 Drawing Sheets

(56) References Cited

U.S. PATENT DOCUMENTS

2017/0185815 A1    6/2017  Itoh
2018/0148272 A1*  5/2018  Wagner .................. B65G 47/82
2022/0339800 A1*  10/2022  Poteet ................... B25B 11/005

OTHER PUBLICATIONS

PCT/IB2023/051479, "Invitation to Pay Additional Fees and, Where Applicable, Protest Fee", Nov. 24, 2023, 10 pages.
Application No. PCT/IB2023/051479, International Search Report and Written Opinion, Mailed On Aug. 16, 2024, 19 pages.

* cited by examiner

SYSTEM AND METHODS FOR IDENTIFYING OBJECTS

CROSS REFERENCE TO RELATED APPLICATIONS

This application claims the benefit of EP Application Serial No. 23461508.6, filed Feb. 2, 2023, which is hereby incorporated by reference in its entirety for all purposes.

RELATED FIELDS

The present technology relates to components and apparatuses for identifying objects. More specifically, the present technology relates to identification devices, systems, and methods for identifying objects in a plurality of objects traveling on a conveyer mechanism.

BACKGROUND

During the manufacture of objects, such as beverage cans, it is imperative to monitor of consistency and accuracy at which the objects are being manufactured. Often several machines may be used to complete each step of manufacturing each object. Therefore, to achieve a consistent product despite the use of a plurality of machines, it is particularly important to monitor the efficacy and accuracy of each machine. In order to adequately monitor each machine, a representative sample or samples of manufactured objects may be taken and analyzed or tested to ensure that they fall within acceptable tolerances of accuracy and efficiency. However, collecting a sample can be difficult, especially when the items are being moved on a conveyer mechanism. Typically, a manual process is used to collect and identify a sample of objects that are then analyzed or tested, resulting in a time intensive and inefficient process. In addition, current methods of manufacturing frequently operate at high speeds (oftentimes exceeding 200, 500, or 1000 objects per minute in each manufacturing line). Therefore, machines operating outside of acceptable tolerances may produce a large number of objects prior to the error being found. For at least this reason, the need exists for a cost-effective and efficient method for identifying desired objects from a plurality of objects moving on a conveyer mechanism.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described therein or to limit the meaning or scope of the patent claims below. Embodiments of the invention covered by this patent are defined by the below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Described herein are several examples of a system for identifying objects on a conveyer mechanism and related methods that represent significant improvements over earlier systems and methods. The system and methods described herein may be automated as to be easier to use, efficient and low-cost relative to earlier systems and methods.

Some embodiments of the present technology may include a device for diverting one or more objects from a plurality of objects traveling on a conveyer mechanism, the device including: a diverting bar including a pivot end, a free end opposite the pivot end, and a body having a surface positioned between the pivot end and the free end such that the surface is configured to divert the one or more objects, wherein the body is positioned at least partially over the conveyer mechanism. The device further comprises a counterweight operably coupled to the diverting bar. The counterweight is configured to apply a biasing force against the one or more objects contacting the surface of the diverting bar.

Some embodiments of the present technology may include a device for identifying one or more objects from a plurality of objects, the device including: an object collector configured to accept an object from a conveyer mechanism, the object collector including a moveable surface configured to move between a first position that accepts the object and a second position that delivers the object. The device further comprises an object inspector including at least one imaging device configured to image at least one marking on the object. The device further comprises a selection arm configured to accept the object from the object inspector, wherein the selection arm is further configured to either deliver the object to a target position or to deliver the object back to the conveyer mechanism, and wherein the selection arm delivers the object to the target position or back to the conveyer mechanism.

Some embodiments of the present technology may include a system for identifying an object, the system including: a conveyor mechanism configured to move a plurality of objects in a first direction; a diverting bar including a pivot end, a free end opposite the pivot end, and a body having a surface positioned between the pivot end and the free end such that the surface is configured to divert one or more objects of the plurality of objects. The body is positioned at least partially over the conveyer mechanism. The system includes a counterweight operably coupled to the diverting bar, the counterweight configured to apply a biasing force against the one or more objects contacting the surface of the diverting bar. The system also comprises an object collector configured to accept an object from the conveyor mechanism, the object collector including a moveable surface configured to move between a first position that accepts the object and a second position that delivers the object. The system further comprises an object inspector configured to inspect the object for at least one marking, the object inspector including at least one imaging device configured to image the at least one marking on the object. The system also comprises a selection arm configured to either deliver the object to a target position or to deliver the object back to the conveyer mechanism, wherein the selection arm delivers the object to the target position or back to the conveyer mechanism based on the at least one making of the object imaged by the object inspector.

In some embodiments, the disclosure relates to a method for identifying an object, the method including: moving a plurality of objects in a first direction using a conveyer mechanism; diverting one or more objects from the plurality of objects moving on the conveyer mechanism; transferring an object from the plurality of objects from the conveyer mechanism to an object inspector, the object inspector including at least one imaging device; imaging at least one marking on the object using the at least one imaging device; and directing the object to a location based on the at least one imaged marking of the object.

BRIEF DESCRIPTION OF THE DRAWINGS

The disclosure will be readily understood by following detailed description in conjunction with the accompanying drawings, in which.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for illustrative purposes.

DETAILED DESCRIPTION

Embodiments of the present invention are directed to systems and methods for identifying an object such as, but not limited to, a can, packaging container, box, or product which may be positioned on a conveyer mechanism. For example, the systems, devices, and methods described herein may be used to select an object from the plurality of objects on the conveyer mechanism and identify at least one marking on said object. The marking may contain a variety of identification information, including manufacturing data, material data, etc. In some embodiments, the identification information may be used to determine whether the object is one that may need to be tested for quality control or may be returned to the conveyer mechanism. In one particular use case and as noted above, the plurality of objects may be manufactured by a variety of different machines prior to being combined on the conveyer mechanism. To ensure that each machine is operating within acceptable tolerances of accuracy and efficiency, it may be necessary to sample several objects made from each of the machines. Therefore, the systems, devices, and methods described herein may be used to sort through the fast-moving plurality of objects to ensure that a representative sample of the object manufactured by each machine may be collected in a time-efficient and cost-effective manner.

The quality control testing may be accomplished using one or more stations. A station may check for defects within the objects and to ensure that each can meets a required quality control standard. Additionally or alternatively, the station may provide for the identification of the objects to ensure that the correct objects are being transported on the conveyer mechanism. Each station may include one or more sensors (such as imaging sensors, scales, coating thickness gauges, enamel rates, tension meters, and the like) that may be used to determine whether individual cans meet the quality control standards. For example, the sensors may detect dimensions of the object, presence of varnish and/or lacquer, quality of decoration (possibly including a barcode and/or other identifier), presence of coating, packaging quality, and the like.

Figure 1:
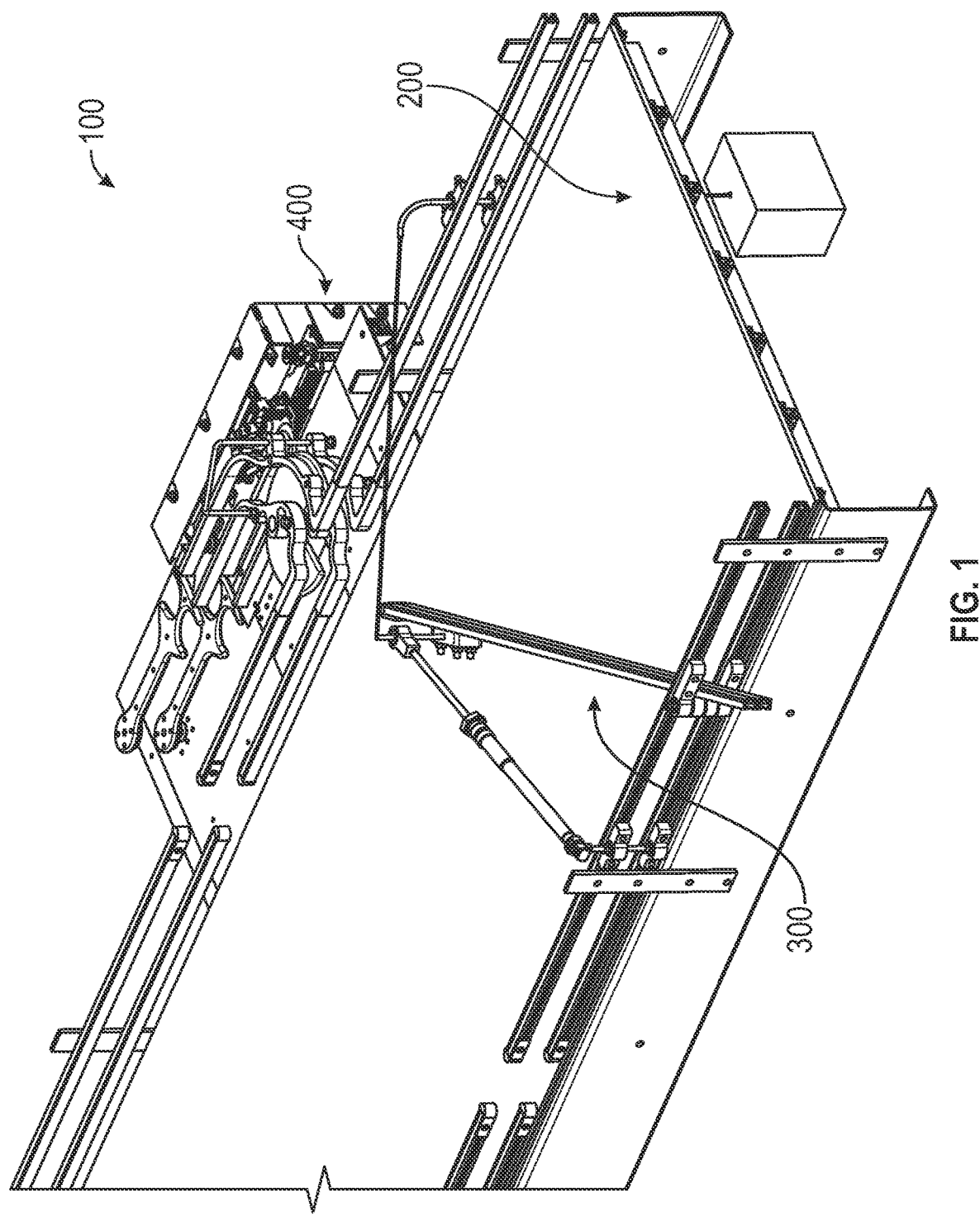
FIG. 1 is a perspective view of a system for identifying objects traveling on a conveyer mechanism in accordance with the present disclosure.

FIGS. 1-11 depict an example of a system 100 for collecting and identifying objects 10 on a conveyer mechanism 200. The system is depicted in a perspective view in FIG. 1 and may include a diverting bar 300 and an object identifier 400. The system may be configured as to divert and collect an object selected from the plurality of objects 10 and to inspect and image the object. The image may then be used to determine whether collected object may be returned back to the conveyer mechanism 200 or may be delivered to a target point or inspection point based on the system's identification of the object 10. Despite FIG. 1 depicting the diverting bar 300 and the object identifier 400 being used in combination, it is envisioned that the diverting bar 300 and the object identifier 400 may also be used separately from one another. Additionally, the plurality of objects 10 are depicted in the figures as cans or soda cans. However, this is merely exemplary, and the plurality of objects 10 may include any variety of objects including cans, boxes, containers, or other objects that me be transferred using a conveyer mechanism 200.

Figure 2:
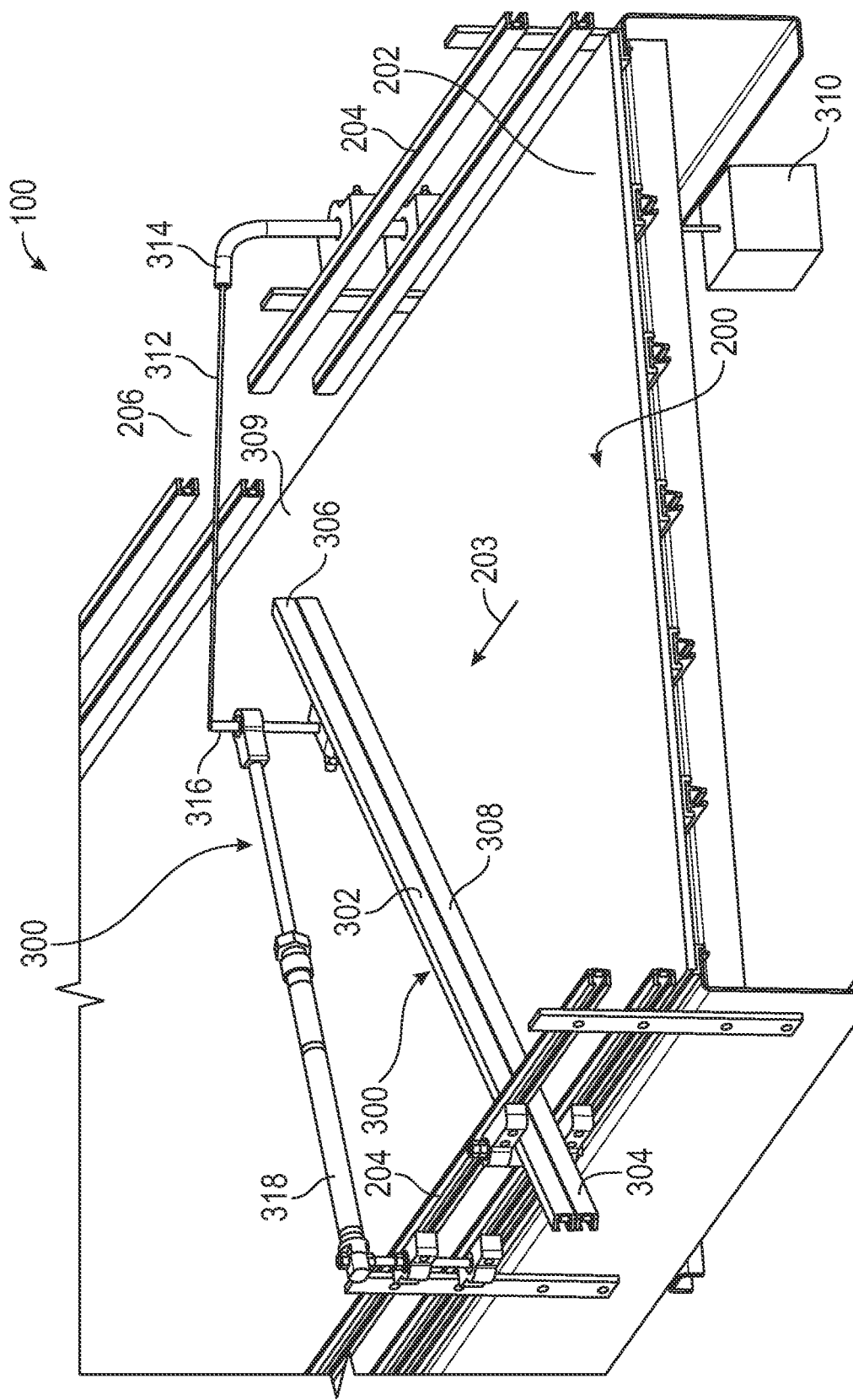
FIG. 2 is a perspective view of an example of a diverting bar positioned on a conveyer mechanism in accordance with the present disclosure.

As shown in FIG. 2, the conveyer mechanism 200 may include a moving surface 202 configured to transport a plurality of objects 10 (omitted for clarity in FIGS. 1-3, but shown in FIG. 4) in a first direction 203. For example, the moving surface 202 may include conveyor belts, vacuum conveyors (such as vacuum bridges), chain conveyors, roller conveyors, chute conveyors, vertical conveyors, wheel conveyors, pneumatic conveyors, and/or other conveyor mechanisms. In some embodiments, at least one guard rail 204 may be positioned on either or both sides of the moving surface 202 in parallel with the first direction as to contain the plurality of objects 10 on the moving surface 202. The conveyer mechanism 200 is depicted in the figures and described herein as traveling in a linear direction, but this is merely exemplary and the conveyer mechanism 200 may be curved and/or angled. Additionally, it is envisioned that the conveyer mechanism 200 may be used in a variety of environments including but not limited to warehousing, food processing, manufacturing, and other related uses.

Figure 3:
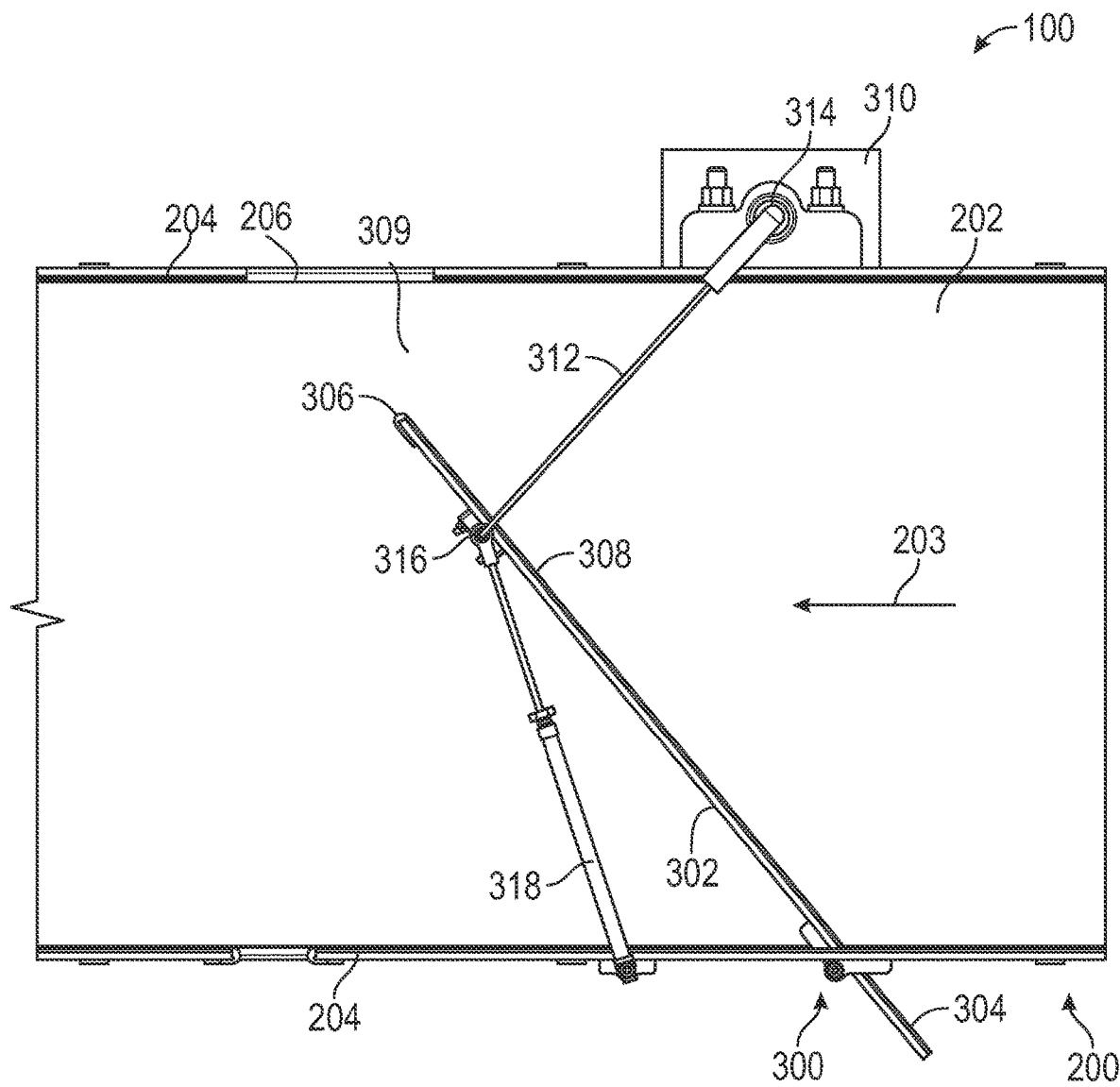
FIG. 3 is a top view of the diverting bar and conveyer mechanism of FIG. 1.
Figure 4:
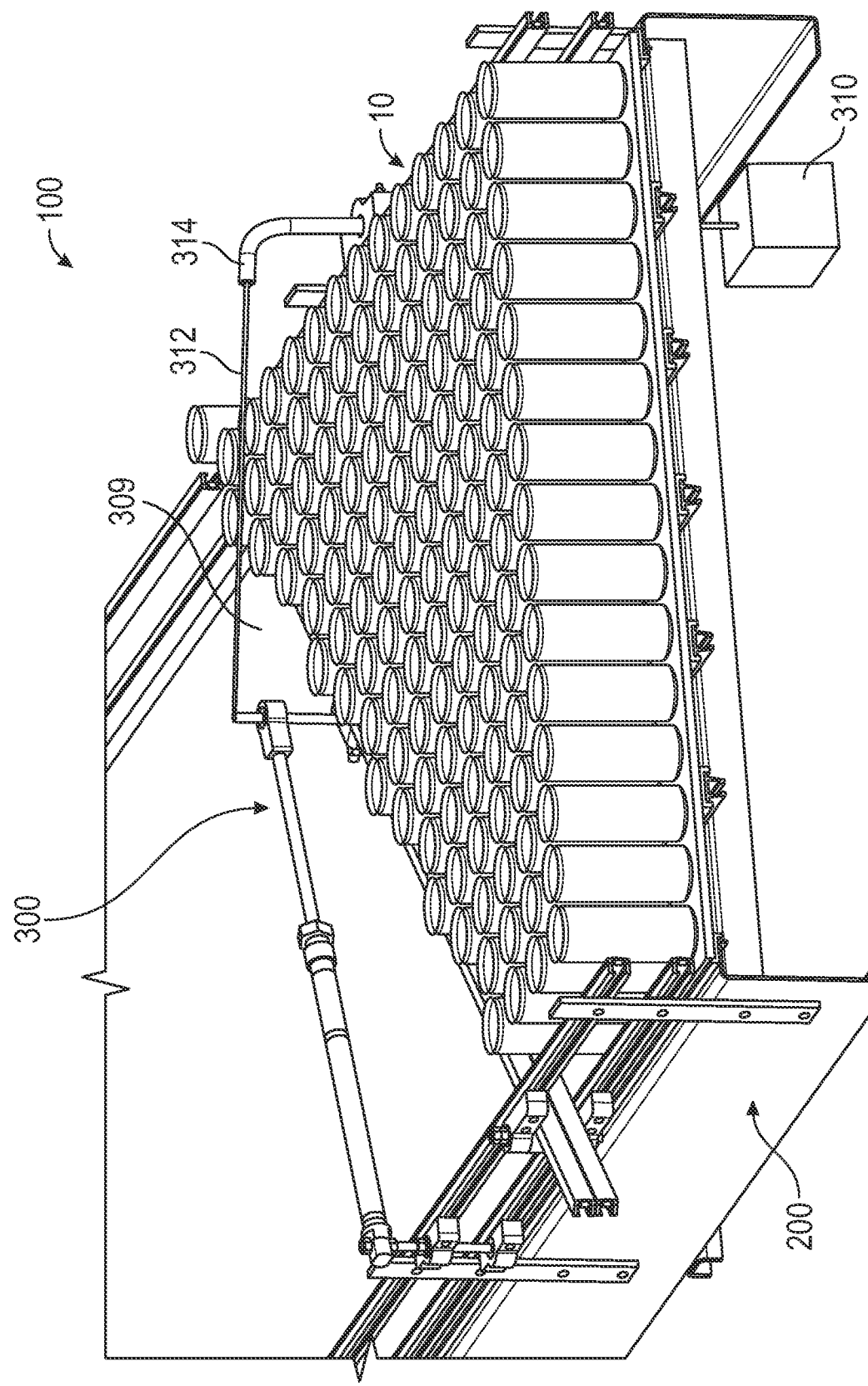
FIG. 4 is a perspective view of the diverting bar and conveyer mechanism of FIG. 1 with a plurality of objects in accordance with the present disclosure.
Figure 5:
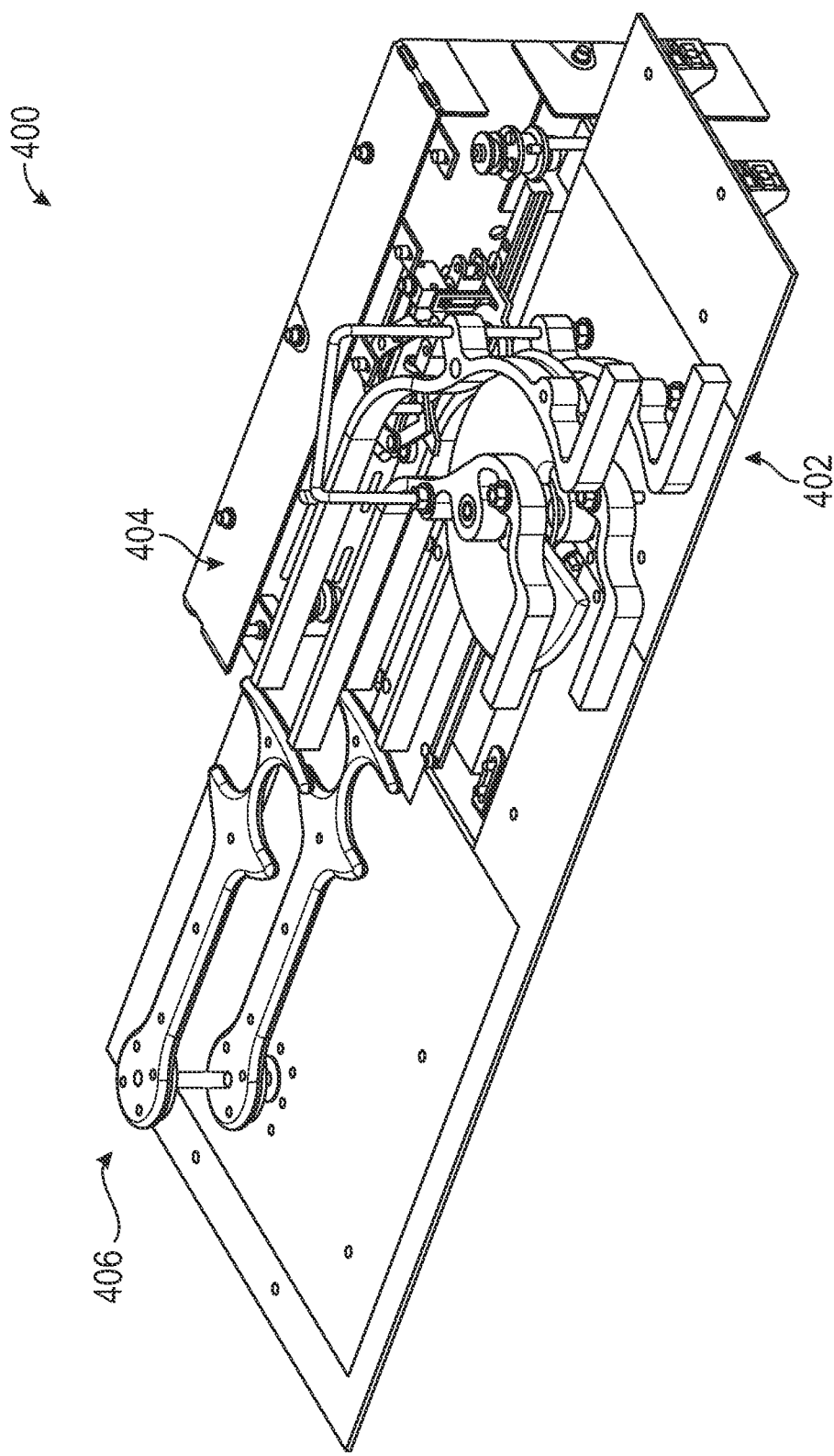
FIG. 5 is a perspective view of an object identifier in accordance with the present disclosure.
Figure 6:
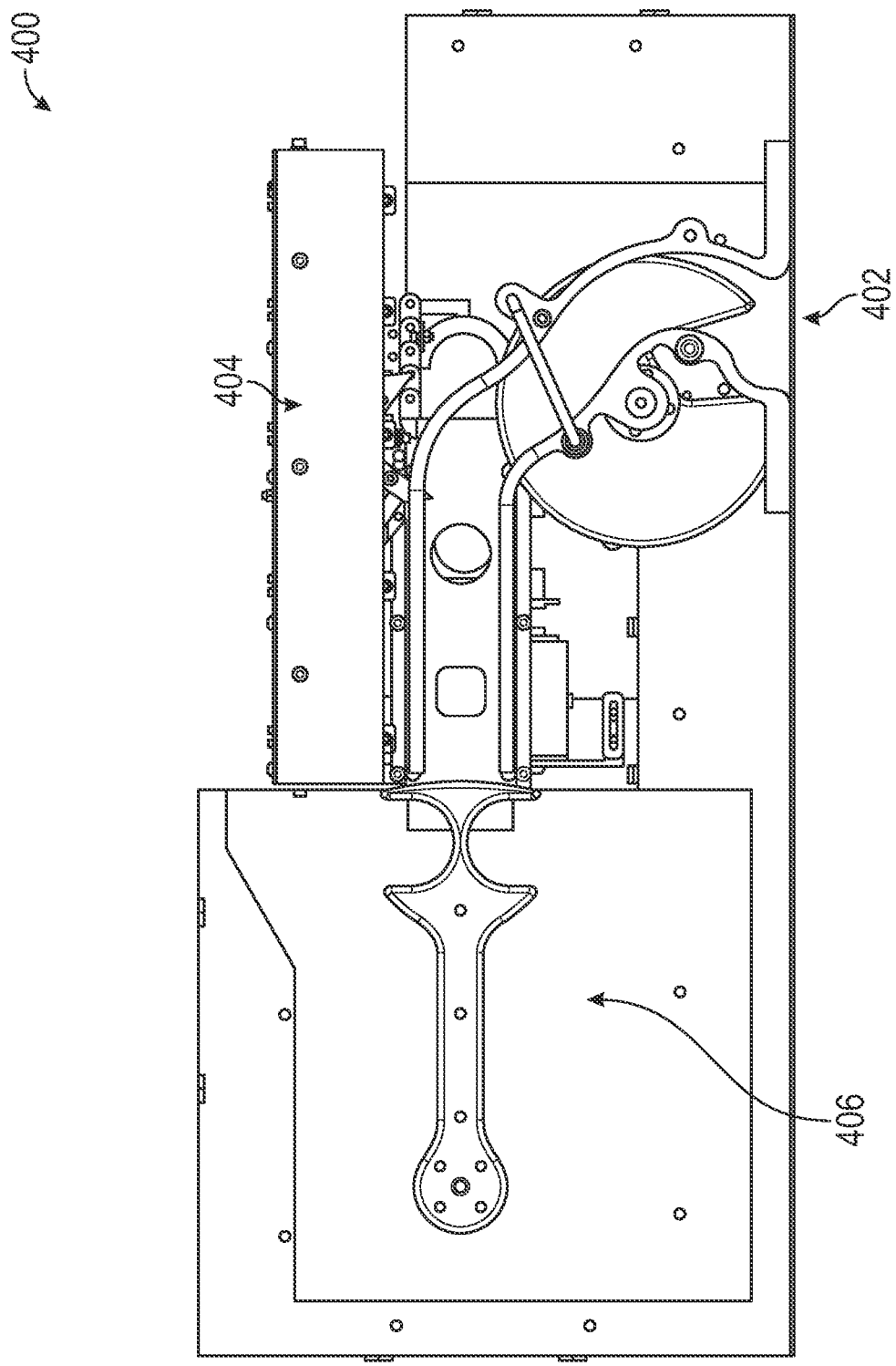
FIG. 6 is a top view of an object identifier of FIG. 5.

The diverting bar 300 is depicted in a variety of view in FIGS. 1-4 and is generally configured to direct or divert the plurality of objects 10 traveling on the conveyer mechanism 200. Referring to FIG. 2, the diverting bar 300 may include a body 302 having a pivot end 304 and a free end 306 opposing the pivot end 304. A portion of the pivot end 304 may be operably coupled to at least one guard rail 204 of the conveyer mechanism 200 to allow for the body 302 to rotate substantially about the pivot end 304, allowing for the body 302 to move relative to the conveyer mechanism 200. The body 302 may additionally include a surface 308 which extends from the pivot end 304 to the free end 306. The surface 308 may be configured to oppose the first direction 203 at an angle such that surface 308 may contact any objects 10 traveling in the first direction 203 on the moving surface 202. The body 302 is positioned to obstruct at least a portion of the conveyer mechanism 200 to divert or redirect the plurality of objects 10. Referring now to FIGS. 3 and 4, which depicts a plurality of objects 10 positioned on the conveyer mechanism 200, it is shown that the body 302 may be positioned such that the plurality of objects 10 are redirected towards a gap 309 between the free end 306 of the body 302 and the guard rail 204 opposing the body 302 of the conveyer mechanism 200. Using the diverting bar 300, the flow and the position of the plurality of objects 10 on the conveyer mechanism may be effectively controlled.

In some cases, the plurality of objects 10 that contact the surface 308 of the body 302 may place a contacting force on the diverting bar 300. In response to the contacting force, the body 302 may bend or move relative to the conveyer mechanism 200. If the contacting force is great enough, the body 302 of the diverting bar 300 may apply a counterpressure against the objects. The counterpressure may reduce the efficiency of the diverting bar 300 and increase the potential for the diverting bar 300 to damage the objects 10. In particular, the magnitude of the contacting force will be dynamic as the number of objects 10 contacting the body 302 changes during operation. Changes in the magnitude of the contacting force may cause varying lateral movement or bending of the body 302, resulting in a potential for the body 302 to apply undesirable and/or unpredictable counterpressure against the objects 10, increasing a risk of damage.

To reduce the risk of damage, a counterweight 310 may be operably coupled to the diverting bar 300 to reduce the magnitude of the counterpressure that may be applied to the objects 10 by the body 302. In particular, the counterweight 310 may be configured to apply a biasing force against the one or more contacting objects 10 in response to the contacting force applied to the body 302. The counterweight 310 may be coupled to the body 302 of the diverting bar 300 such that movement or bending of the body 302 may be translated to vertical movement of the counterweight 310. In other words, as the contacting force applied to the body 302 of the diverting bar 300 increases, the counterweight 310 is moved vertically upwards and, as the contacting force applied decreases the counterweight 310 is moved vertically downwards. In some embodiments, the counterweight 310 uses the force of gravity to provide a consistent linear force in response to changes in the magnitude of the contacting force applied to the diverting bar 300. Therefore, despite increases and decreases in the magnitude of the contacting force, the counterweight 310 is configured to apply a substantially consistent biasing force onto the objects 10 contacting the body 302. The consistent biasing force applied by the counterweight 310 to the objects 10 decreases the risk of rapid changes in the bend or movement of the body 302 as the magnitude of the contacting force changes. By reducing the risk of rapid changes, the risk of counterpressure damaging or destroying the objects 10 is decreased. In some embodiments, it is envisioned that the biasing force applied to the objects 10 contacting the surface 308 of body 302 is not consistent across the entire length of the body 302. In other words, objects 10 positioned closer to the free end 306 may experience a greater biasing force compared to objects 10 positioned closer to the pivot end 304. Despite this, in such embodiments, it is envisioned that the magnitude of change of the biasing force at each point along the length of the body 302 in response to changes the contacting force is reduced.

As shown in FIGS. 1-3, the counterweight 310 may be coupled to the body 302 of the diverting bar 300 using a cord 312, chain, or similar connecting member. In particular, the cord 312 may be secured to the body 302 at a coupling point 316. In some embodiments, the coupling point 316 may be positioned near the free end 306, although this is not necessary, and the cord 312 may be positioned at any position along the length of body 302. The lateral movement of the diverting bar 300 may be converted into vertical movement of the counterweight 310 by running the cord 312 through a guide 314. In some embodiments, the guide 314 may be positioned at and secured to at least one guard rail 204 of the conveyer mechanism 200. Additionally, it is envisioned that other methods such as the use of pulley(s) may be used in place of a guide 314 to convert lateral movement into vertical movement. Though the counterweight 310 is shown as being positioned near conveyer mechanism 200, this is exemplary and the counterweight 310 may be positioned remotely relative to the conveyer mechanism 200. Though a cord 312 is depicted in the figures, any number of methods known in the art may be used to couple the body 302 to the counterweight 310. Additionally, in some embodiments a buffer 318 may be positioned at both the coupling point 316 and a guard rail 204 of the conveyer mechanism 200. The buffer 318 may be configured to reduce or limit the rate of any movement of the body 302 of the diverting bar 300. The buffer 318 may include a suspension, pneumatic mechanisms, spring, or other buffering means. It is envisioned that the buffer 318 may be used independently or in combination with the counterweight 310 to further decrease the risk of damage of objects 10 traveling on the conveyer mechanism 200.

In some embodiments, the diverting bar 300 may be used in conjunction with an opening 206 in one of the guard rails 204 of the conveyer mechanism 200 to collect or remove objects 10 from the conveyer mechanism 200. In this aspect, the body 302 of the diverting bar 300 directs the plurality of objects 10 that contact the surface 308 of the body 302 towards the guard rail 204. As the objects 10 are redirected, the plurality of objects 10 traveling in the first direction 203 may contact the redirected object resulting in a clump or mass of objects 10 that are forced towards the guard rail 204. The opening 206 may be positioned such that at least one object 10 positioned in the resulting clump or mass may be diverted or forced into the opening 206, thereby exiting the conveyer mechanism, while the remaining objects may travel past the diverting bar 300 and thereafter continue in the first direction 203 on the conveyer mechanism 200. Therefore, the opening 206 may be used as an access point to collect a limited number of objects 10 from the plurality of objects 10 traveling on the conveyer mechanism 200. In addition, the opening 206 may be sized as to accept a singular or multitude of objects 10 allowing for a variation depending on the desired application.

The object identifier 400 is depicted in a variety of views in FIGS. 5-11. The object identifier 400 may be configured to identify at least one marking positioned on an object and use information to either deliver the object to a target location or to return the object to the conveyer mechanism. As noted above, each object may include at least one marking that may indicate information related to manufacturing history and or material properties. As shown in FIGS.

5-7, the object identifier 400 may include an object collector 402, an object inspector 404, and a selection arm 406. Generally, the object collector 402 may be configured to accept at least one object from the conveyer mechanism 200, and, in some embodiments, deliver the object to the object inspector 404. The object inspector 404 may be configured as to image at least a portion of the object accepted by the object collector 402 and, in particular, may use an imaging device 414 to image at least one marking positioned on the object 10. The selection arm 406 may be configured as to accept the object 10 from the object inspector 404 and to deliver the object 10 to a location based on the imaged portion of the object 10. Additional information relating to the object collector 402, the object inspector 404, and the selection arm 406 will be discussed in greater detail below. Notably, the figures illustrate the object collector as being disposed sequentially before the object inspector. It is contemplated, however, that the object inspector may be incorporated into the object collector, into the selection arm mechanism, or disposed upstream of the object collector, e.g., in the region of opening 206.

Figure 7:
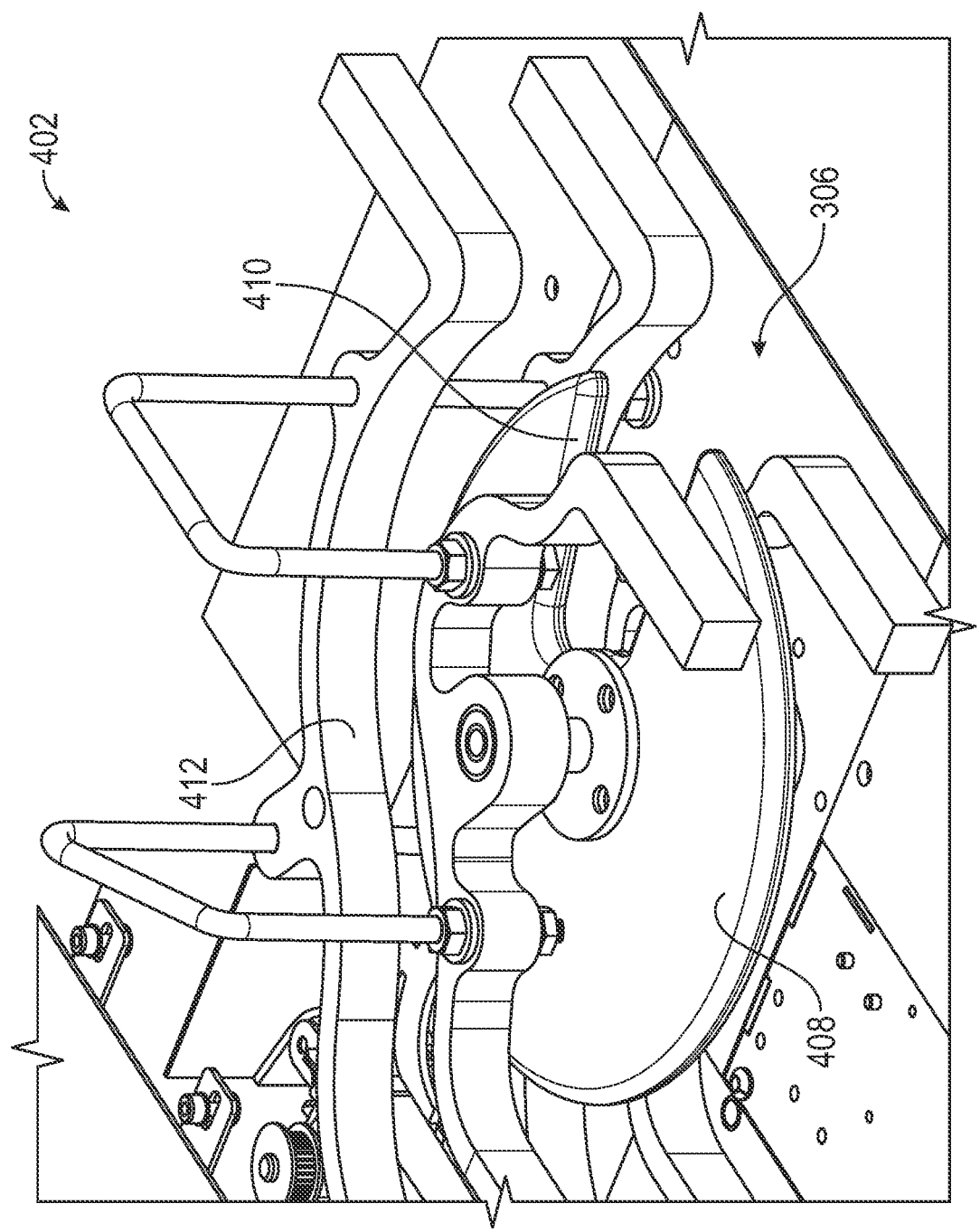
FIG. 7 is a perspective view of an object collector at a first position in accordance with the present disclosure.
Figure 8:
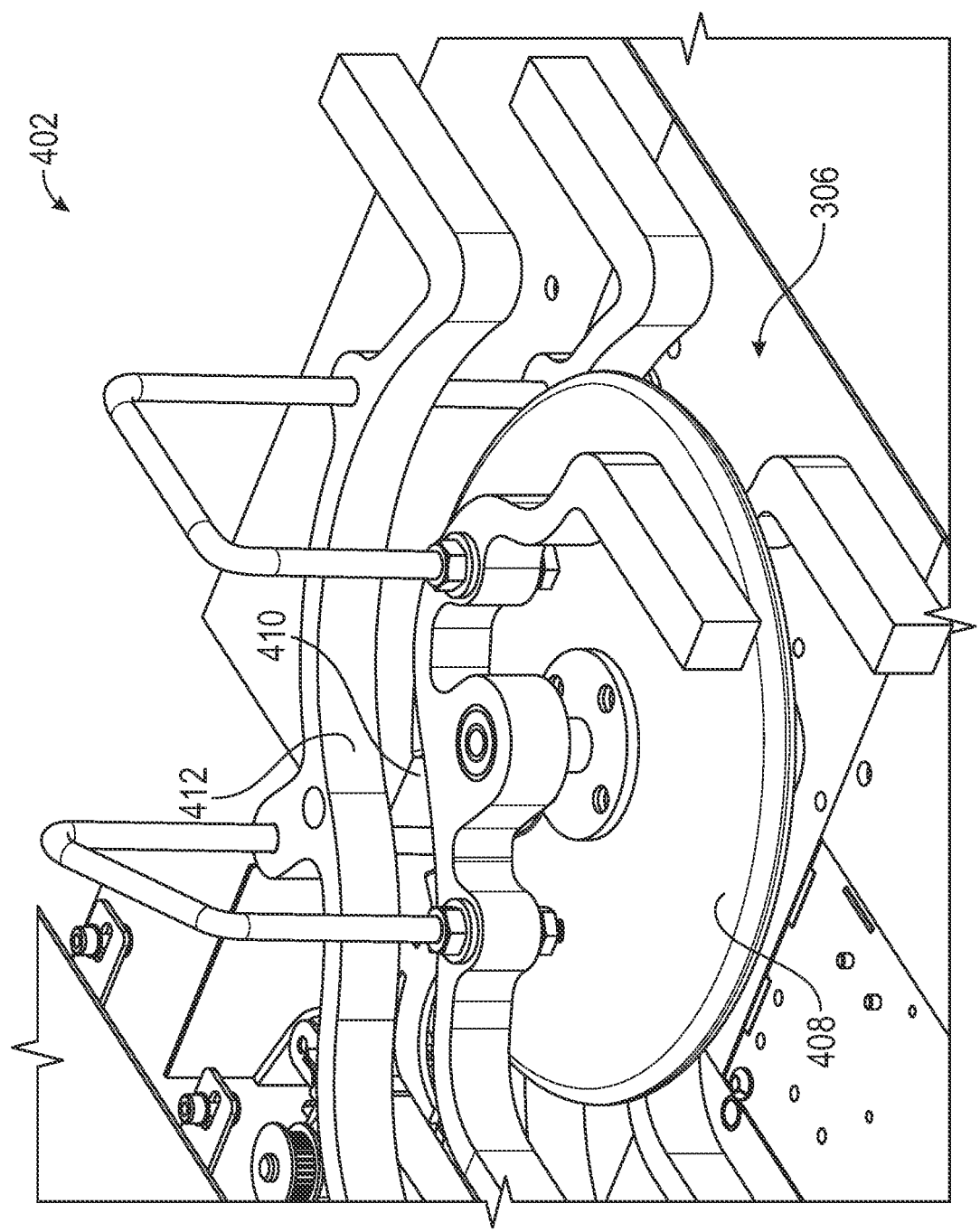
FIG. 8 is a perspective view of the object collector of FIG. 7 at a second position in accordance with the present disclosure.

An embodiment of the object collector 402 is depicted in close-up views in FIG. 7 and FIG. 8. Generally, the object collector 402 may include a moveable surface 408 and a guide rail 412. The moveable surface 408 may be configured as to move between a first position, as shown in FIG. 7, and a second position, as shown in FIG. 8. When in the first position, the moveable surface 408 may be configured to accept an object from the conveyer mechanism 200, while in the second position, the moveable surface 408 may be configured as to deliver the object to the object inspector 404. To properly secure the object, the moveable surface 408 may include a slot 410 sized and configured to accept and/or grasp at least one object. In some embodiments, the moveable surface 408 and the slot 410 may be positioned at the opening 206 of the conveyer mechanism 200 such that objects may be directed through the opening 206 and into the slot 410. Sensors (not shown) may be positioned at the moveable surface 408, such that the object collector 402 may recognize when an object is positioned within slot 410. To move between the first position and the second position the moveable surface 408 may rotate, subsequently moving the object 10 from the first position to the second position. The moveable surface 408 is depicted as rotating in the figures. This embodiment, however, is merely exemplary and not intended to be limiting, as a variety of methods of moving between the first position and the second position are possible.

Figure 9:
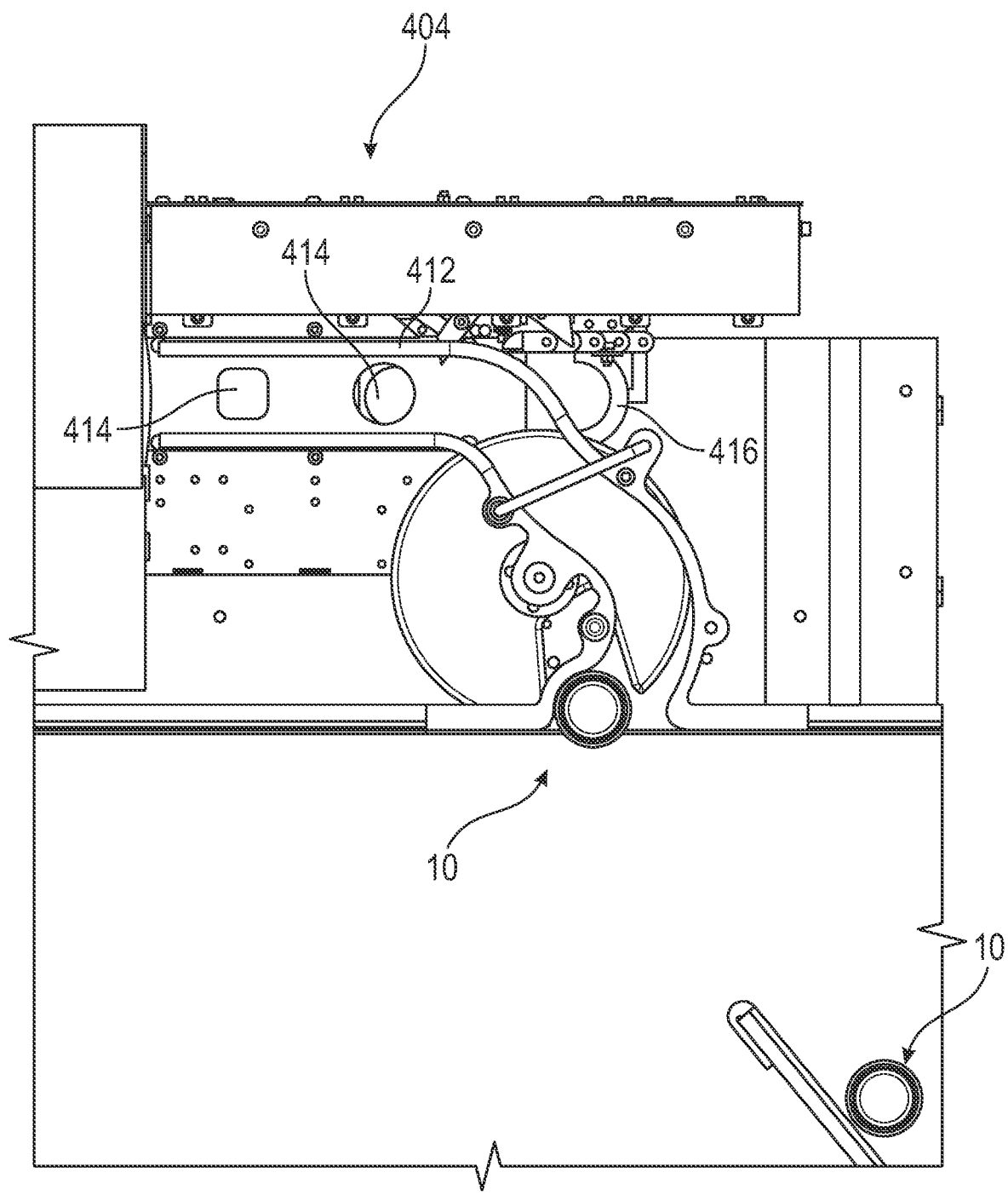
FIG. 9 is a top view of an object inspector in accordance with the present disclosure.

An embodiment of the object inspector 404 is depicted in a top view in FIG. 9. As noted previously, the object inspector 404 may include an imaging device 414 which may be configured to image at least one marking positioned on each of the objects. Each object may include a marking positioned on the object. The marking may indicate some identification information such as manufacturing data and/or material data and/or contents information. The marking may take the form of an embossed marking, a barcode, a QR code, an ultraviolet marking, a visible light marking, and/or other information known for marking an object 10. In some embodiments, each object may include a plurality of markings, and each marking may be positioned on any portion of the object or on multiple portions of the object.

To image the marking or marking, the at least one imaging device 414 may be a camera, such as a digital camera that include charge-coupled (CCD) and/or complementary metal-oxide semiconductor (CMOS) sensor and/or may include other types of imaging devices that may detect a marking. The imaging device 414 may capture still images and/or video images. For example, the imaging device 414 may image the object multiple times in order to adequately capture the marking and to reduce the risk of misidentifying the marking. In some embodiments, optical sensors may be used as opposed to cameras, such as a barcode scanner. Alternatively, the imaging device 414 may be configured to capture light rays outside the visible spectrum, such an ultraviolet light imaging device. In some embodiments, it is beneficial to use a plurality of imaging devices 414 so that a singular object inspector 404 may be used to capture a large variety of different markings, without the need for replacing or exchanging equipment.

Referring again to FIG. 9, the object inspector 404 is shown having a plurality of imaging devices 414 positioned such that the imaging devices 414 are facing upwards. In the embodiment of the object inspector 404 shown, it is envisioned that the at least one marking is positioned on the bottom or the base of each object. Therefore, as an object is moved across each of the imaging devices 414, the marking is exposed allowing for the imaging devices 414 to image the marking. In some embodiments, the object inspector 404 includes a carrier 416 configured to accept the object from the movable surface 408 of the object collector 402 and to move the object across each of the imaging devices 414. At least one sensor (not shown) may be positioned at the carrier 416 and/or the object inspector 404 as to determine the presence of an object. In some embodiments, the imaging devices 414 may be positioned at the object collector 402 such that the imaging devices 414 may image the marking as the movable surface moves between the first position and the second position, removing the need for the carrier 416. Though the imaging devices 414 are shown facing upwards in the figures, this is merely exemplary. A variety of different image device configurations and orientations are envisioned to meet various applications. For example, in some embodiments, the markings may be positioned at different locations on each object, requiring that each of the imaging devices 414 be positioned such that they may properly image the marking. Alternatively, it is envisioned that in some embodiments that it may be beneficial to move the imaging devices 414 relative the object, as opposed to moving the object relative to the imaging devices 414.

Referring to FIGS. 7-9, in some embodiments, the object collector 402 and the object inspector 404 may additionally include a rail 412 that is configured to guide each object from the conveyer mechanism 200 to the object inspector 404. In particular, a portion of the rail 412 may be positioned at the moveable surface 408 of the object collector 402 to secure and direct the object while the moveable surface 408 moves between the first position and the second position. Similarly, the rail 412 may be positioned at the object inspector 404 such that as the carrier 416 moves the object relative to the imaging devices 414, the rail 412 ensure that the object stays in the proper orientation.

Figure 10:
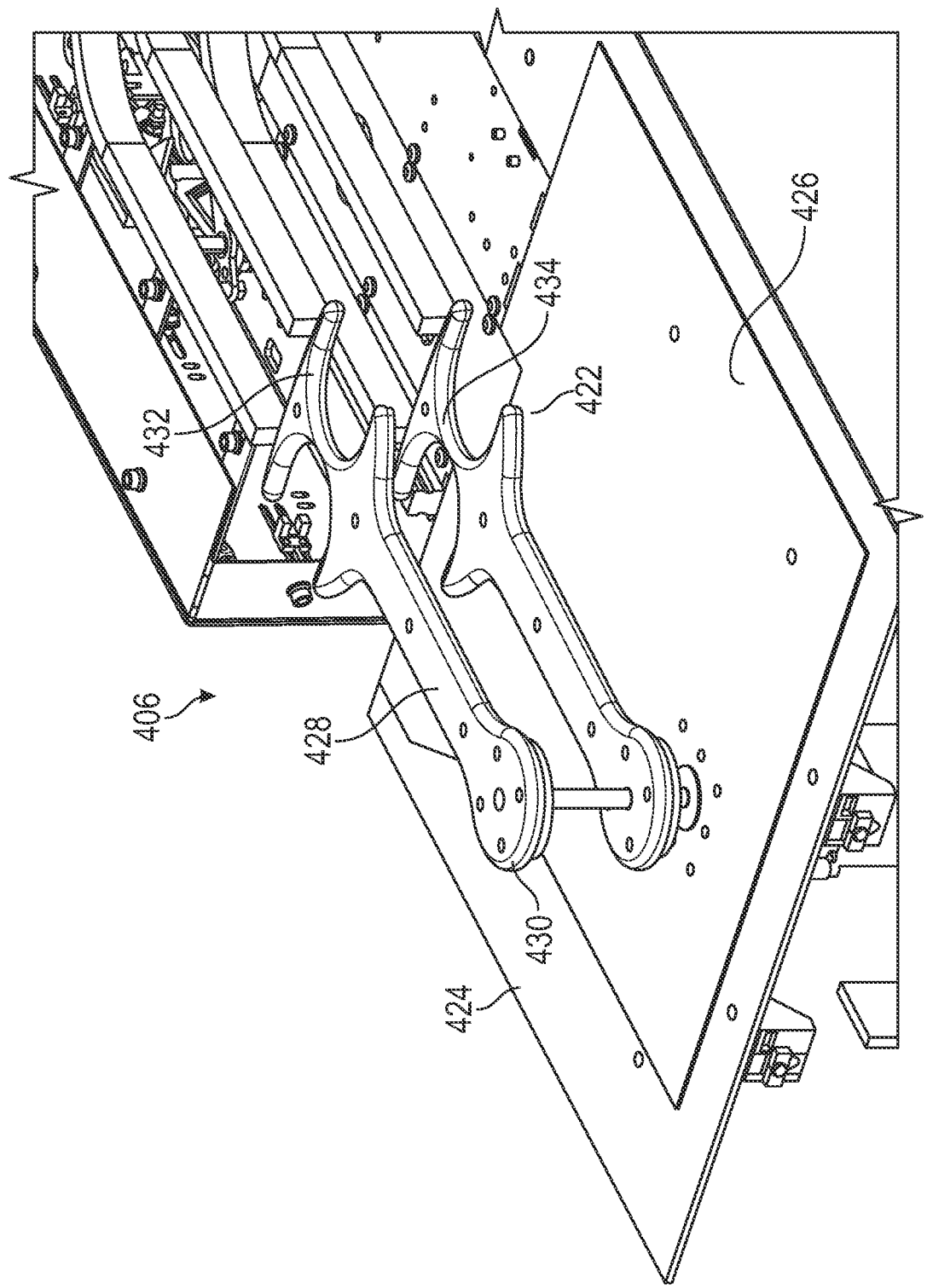
FIG. 10 is a perspective view of a selection arm in accordance with the present disclosure.
Figure 11:
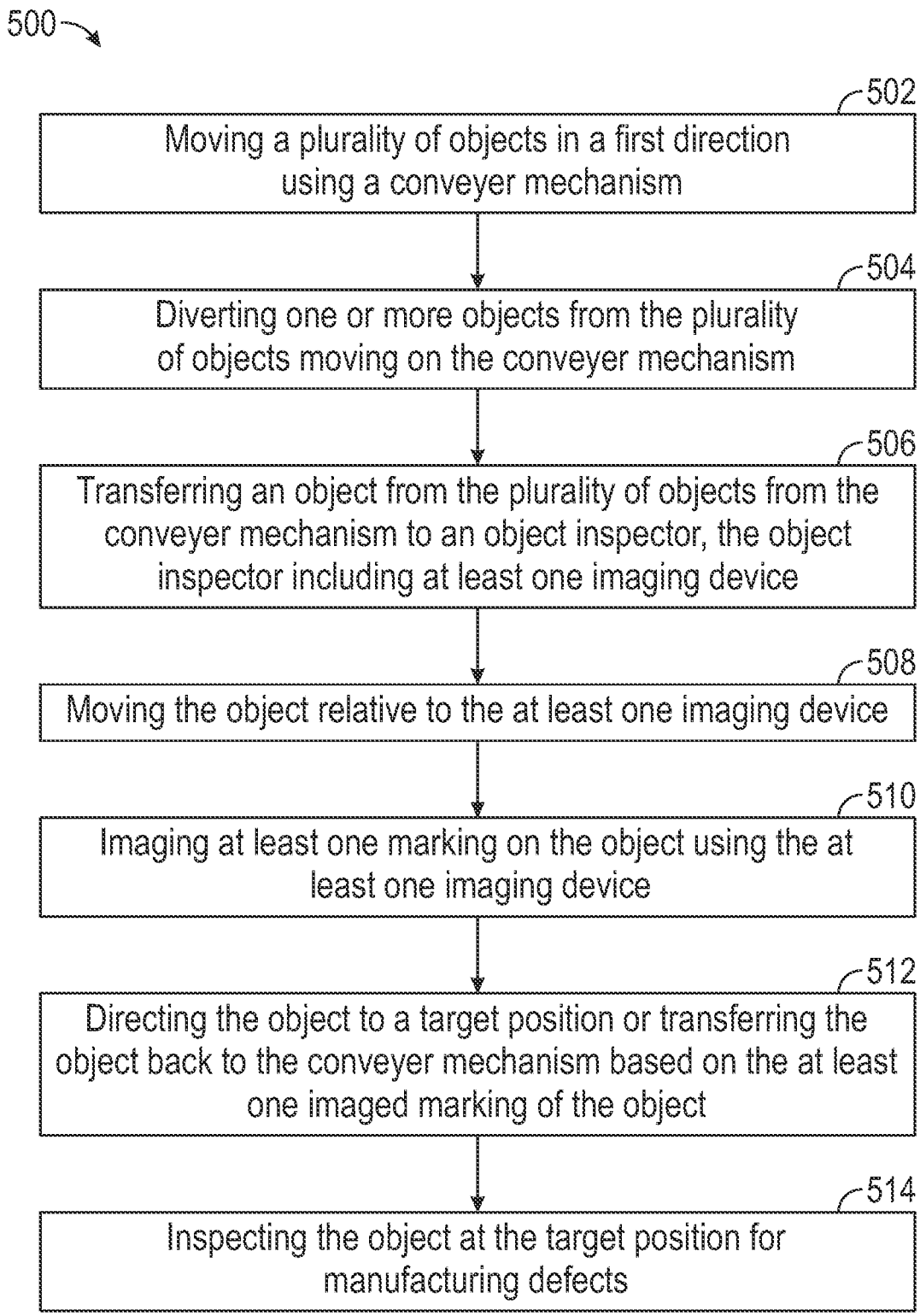
FIG. 11 is a flowchart illustrating a method for identifying an object from a plurality of objects traveling on a conveyer mechanism in accordance with the present disclosure.

The selection arm 406 is depicted in a perspective view in FIG. 10. As previously noted, the selection arm 406 may be configured to accept the object from the object inspector 404 and to deliver the object to a separate location, for example, based on the at least one marking imaged by the object inspector 404. Generally, the selection arm 406 may include a body 428 having a first end 430 and a second end 432 opposing the first end 430. The first end 430 may be oriented at a pivot end, as shown, to allow for the body 428 to rotate about the first end 430, while the second end 432 may be configured to accept the object using a grasping or holding element 434. As shown in FIG. 10, the holding element 434 may be configured such that it includes a counter-clockwise facing holding element and a clock-wise facing holding element.

To accept and move the object, the selection arm 406 may rotate between an initial position 422, a target position 424, and a return position 426. When positioned at the initial position 422, the selection arm 406 may accept the object from the object inspector 404. In particular, the carrier 416 may deliver the object to the initial position after moving the object relative to the imaging devices 414. Once the object is secured by the arm 406, the arm 406 may rotate. For example, the selection arm 406 may rotate counter-clockwise from the initial position 422 to deliver the object to the target position 424 and rotate clockwise from the initial position 422 to deliver the object to the return position 426.

In some embodiments, the selection arm 406 may deliver the object to either the target position 424 or to the return position 426 based on a determination of the object inspector 404. That is, the at least one imaged marking may contain information indicating that the object 10 is desired, such as for quality control testing, and, in such cases, the selection arm 406 may move the object to the target position 424 for further analysis. Alternatively, if the imaged marking indicates that the object is not desired, the selection arm 406 may move the object to the return position 426 so as to return the object to the conveyer mechanism 200. The selection arm 406 described herein is merely exemplary; a variety of different methods for moving the object from an initial position 422 to either a target position 424 or a return position 426, such as conveyer mechanisms, robotic arms, gravity-based solution, or other methods known in the art, may be used.

Figure 12:
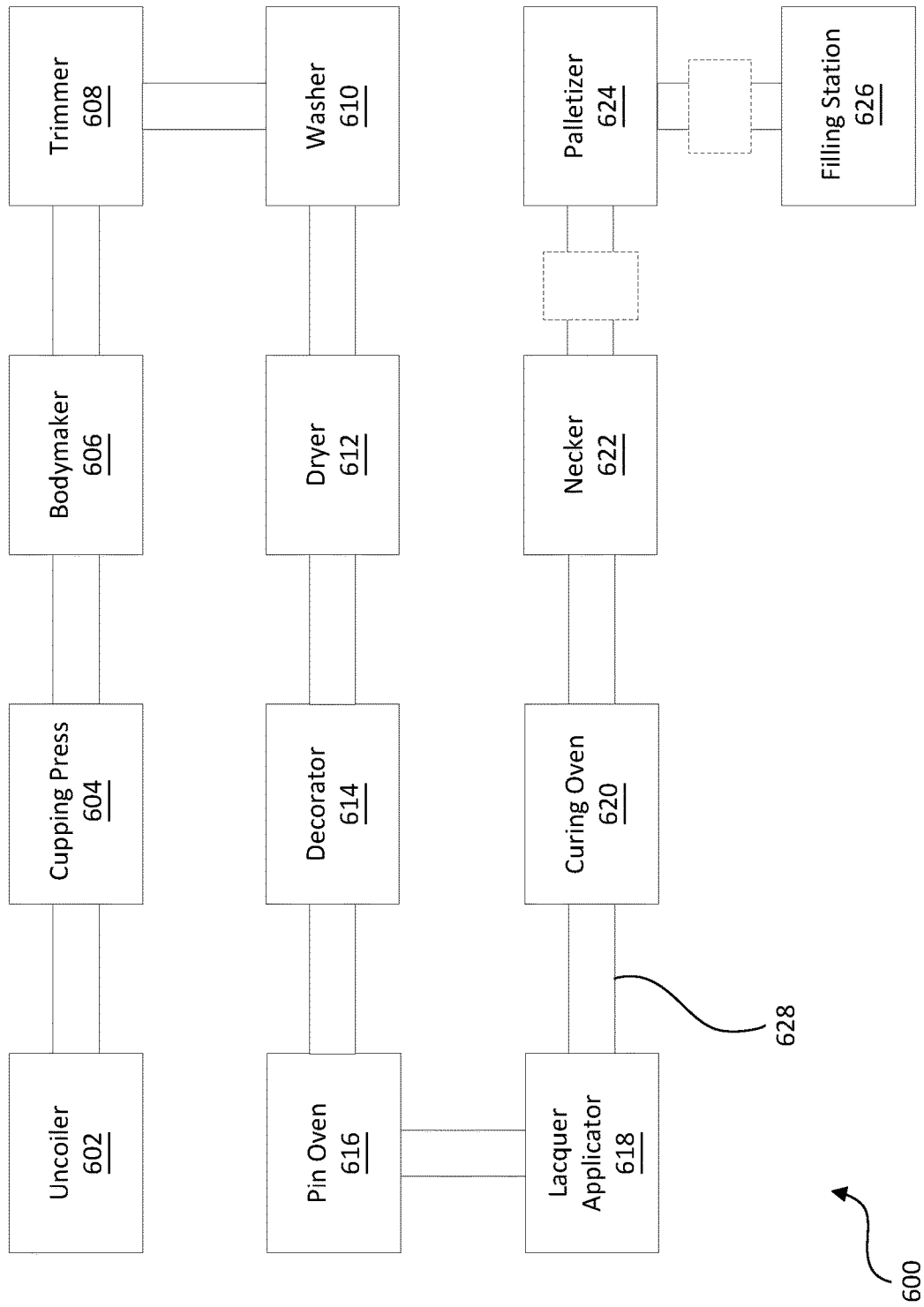
FIG. 12 illustrates a schematic view of a production line 600 for producing a plurality of objects in accordance with the present disclosure.

An example of a method 500 for identifying an object on a conveyer mechanism is depicted in FIG. 12.

The method 500 may begin at operation 502 and can include moving a plurality of objects in a first direction 203 using a conveyer mechanism 200. The plurality of objects may include cans, boxes, containers, or other objects that may feasibly be transferred using a conveyer mechanism 200. As described above, the conveyer mechanism 200 may include a moving surface 202 configured to move or translate the plurality of objects. The moving surface 202 may be a conveyer belt, vacuum conveyors (such as vacuum bridges), chain conveyors, roller conveyors, chute conveyors, vertical conveyors, wheel conveyors, pneumatic conveyors, and/or other conveyor mechanisms. The conveyer mechanism 200 additionally includes at least one guard rail 204 configured as to contain the plurality of objects on the moving surface 202.

The method 500 at operation 504 can include diverting one or more objects from the plurality of objects 10 moving on the conveyer mechanism 200. The diverting of the object may be accomplished using the diverting bar 300 as described above. The diverting bar 300 may generally include a body 302 having a pivot end 304 and a free end 306. The body 302 of the diverting bar 300 may be positioned at least partially at the conveyer mechanism 200 such that the plurality of objects 10 moving on the mechanism 200 may contact the body 302. To explain, the body 302 obstructs the movement of the plurality of objects 10 such that they are redirected towards a gap 309 between the free end 306 of the body 302 and the guard rail 204 of the conveyer mechanism 200. In some embodiments, diverting one or more objects additionally includes directing one or more objects into an opening 206 of the guard rail 204 of the conveyer mechanism 200. Additionally, the diverting bar 300 may also include a counterweight 310 as discussed in detail above to reduce any undesirable or unintended forces that may result from movement of the diverting bar 300.

The method 500 at operation 506 can include transferring an object from the plurality of objects 10 from the conveyer mechanism 200 to an object identifier 400 as described above. The object identifier 400 may include the object collector 402 which, as discussed above, may be configured to accept an object from the conveyer mechanism 200. In particular, the object collector 402 may be positioned at the opening 206 of the guard rail 204. Therefore, objects that are diverted into the opening 206 during operation 504 may be accepted by the object collector 402. In some embodiments, once accepted, the object collector 402 may move between a first position and a second position delivering the object inspector 404.

The method 500 at operation 508 can include imaging at least one marking of the transferred object. In particular, the object inspector 404 of the object identifier 400 as described above may be used to image the at least one marking. Said markings may include embossed markings, barcodes, QR codes, ultraviolet markings, visibly markings, etc. Therefore, it is envisioned that the object inspector 404 may use a variety of imaging techniques, including cameras, barcode scanner, and ultraviolet cameras to detect and image each of the proposed types of markings. Additional information regarding the types of imaging devices 414 that may be used by the object inspector 404 may be found above in relation to the detailed discussion of the object inspector above 404.

The method 500 at operation 510 can include directing the object to a location based on the at least one imaged marking of the object. Using the imaged marking, the object inspector 404 may make a determination as to direct the object to a target position 424 or to return the object to the conveyer mechanism 200. In further detail, the at least one imaged marking may contain information indicating that the object is desired, such as for quality control testing, and, in such cases, the object inspector 404 will indicate that the object may be directed towards the target position 424. Alternatively, if the imaged marking indicates that the object is not desired, the method 500 may include operation 512 in which the object may be transferred back to the conveyor mechanism 200.

In some embodiments, the method 500 may include the additional operation 514 of inspecting the object for manufacturing defects if it is positioned at moved to the target position 424 in operation 510. As discussed in detail above, a plurality of objects 10 may be manufactured using a variety of different machines prior to being combined on the conveyer mechanism 200. Each of these machines may be consistently monitored to ensure that each of the machines is operating within specific tolerances. To do so, a representative sample or samples of an object made by each machine must be collected and regularly tested. To differentiate each object, each of the manufacturing machine may mark each object with a unique mark indicating that the object was made by the machine. Using the method 500 as described above, objects may be collected, imaged, and either returned to the conveyor mechanism 200 or sent for inspection depending on whether the object is one that needs to be tested. Method 500 may provide an advantage over currently used methods by removing the manual aspect of collecting each object for inspection.

FIG. 12 illustrates a schematic of an exemplary production line 600 for producing objects, particularly for producing beverages cans, such as an aluminum can. The devices, systems, and method described above may be incorporated into any portion of the production line 600 described below, and the production line 600 as described below as merely exemplary and is not intended to be limiting.

The production line 600 will be described as including a number of different devices and is merely representative of one example of a production line. It will be appreciated that numerous variations may exist and that functionality described in relation to one or more devices may be combined and performed by a single device in some embodiments, while in other embodiments attributed to a singled device may be performed by a number of distinct devices. Additionally, some embodiments may include additional steps and/or omit one or more steps. Production line 600 may include an uncoiler 602 that lubricates sheet metal and feeds the lubricated sheet metal into a cupping press 604. The cupping press 604 may include a punch that punches out disc-shaped blanks from the sheet metal and subsequently forms the blanks into cup-shapes. For example, the flat disc-shaped blanks may be positioned between a drawing die and a blank holder. The drawing die may define a receptacle that is sized to be larger than a final diameter of the finished can. A punch may press a portion of the blank into the receptacle such that the blank is transformed into a cup-shape.

The cup-shaped blank may be transported to a bodymaker 606, which may form a general shape of the can. For example, the bodymaker 606 may position each cup-shaped blank over a re-drawing die, which may have a diameter that approximately matches a diameter of the finished can. A punch may press the cup-shaped blank through the re-drawing die, which increases the height of the blank while reducing a diameter of the blank to be approximately equal to that of the finished can. After re-drawing the blank, a number of ironing stages may be performed on each blank. For example, in some embodiments each can blank may be passed through three or more ironing stages. At each ironing stage, the blank may be positioned over an ironing die that defines a central aperture, with each successive ironing stage having an ironing die that has an inner diameter that is slightly smaller than the outer diameter of the can blank. At each stage, a punch may press the can blank through the ironing die, which causes the can blank to be stretched vertically, while keeping an inner diameter of the blank unchanged. The ironing process may be repeated any number of times until the can blank has a height that is greater than a final height of the finished can. Oftentimes, during the drawing, re-drawing, and/or ironing process, the bodymaker 606 may spray or otherwise supply a lubricating fluid to the can blank to lubricate and cool the can blank during formation of the can body. After ironing, the blank may be domed. For example, the can blank may be positioned over a doming tool that has a convex dome-shaped surface. A punch having a concave lower surface may press a bottom surface of the blank against the doming tool to form a dome-shaped indentation on the bottom of the blank. After the dome-shaped indention is formed, the blank may be transported to a trimmer 608. The trimmer 108 may trim and/or otherwise remove a top end of the blank such that the top end of the blank has a straight top edge and such that the can blank has a desired height.

After trimming, the blanks may be transported to a washer 610. A number of washing and/or etching operations may be performed on each blank to wash away lubricants from the bodymaker 606 and/or to prepare the surface of the can blank for printing. For example, in some embodiments, a six-stage cleaning process may be performed. In some embodiments, each can blank may be sprayed with two stages of an acid wash. For example, the acidic wash may include sulfuric acid (such as 30% to 40% molar $H_2SO_4$) and/or other acid-based cleaning agents, which may etch and/or otherwise remove a thin layer of material from the surface of the can blank. Additional cleaning solutions may include, without limitation, Ridoline 740E, Ridoline 120SNF, Bonderite 404S, and/or Bonderite 77 produced by Henkel of Düsseldorf, Germany.

A number of water washes may be performed on each can blank after the acid wash stages. For example, deionized water may be sprayed and/or otherwise applied to the can blank to rinse away the other cleaning solutions. After washing, the can blanks may be transported to a dryer 612. The dryer 612 may include an oven, air jet, and/or other drying mechanism that may dry the can blanks prior to applying any decoration to the can blank.

The dried can blanks may be transported to a decorator 614, which may apply a decoration (such as a brand name, product name, nutrition information, etc.) to an outer surface of the can blank. The decorator 614 may apply any decoration to the outer surface of the can blank in one or more steps. For example, the decorator 614 may be an 8-color offset machine (or other number of colors) that may apply ink to the outer surface of the can blank using a rotation printing process to generate a desired decoration. After printing the decoration, the decorator 614 may apply an overprint varnish to protect the ink. A bottom of the can may be rim-coated, which may help facilitate rotation and/or other movement of the can blank along the production line. The decorated can blanks may be cured within a pin oven 616 to harden the ink and varnish.

The cured can blanks may be transported to a lacquer applicator 618. The lacquer applicator 618 may apply a food-grade lacquer to an interior surface of each can blank. This lacquer may help ensure that the final beverage and metal do not contact and/or react with one another. For example, the lacquer may prevent a beverage from eating through the metal, and may also prevent materials from the metal from leeching into and/or reacting with the beverage. The lacquer may be dried within a curing oven 620.

The can blanks may then be transported to a necker 622. The necker 622 may shape a top end of the can blank to form a neck. For example, a number of necking stages may gradually narrow the top end of the can blank to form the neck. Each necking stage may include an inner die that is inserted within the can blank and a necking die that is positioned outside the can blank. In each stage, the necking die has a slightly smaller inner diameter so as to slightly bend the top of the can inward to form the neck. In some instances, as many as 11 necking stages may be used to form the neck. Once the neck is formed, a top edge of the neck may be curved over to form a flange that may later be used in sealing the can. After the neck has been flanged, the cans may be transported to a palletizer 624, which may arrange the cans on pallets for transport to a filling facility and/or station 626.

The filling station 626 may be in a same facility as the rest of the production line 600 and/or may be located in a remote facility. For example, a manufacturer of the cans may provide the palletized cans to a bottler, which may fill and seal the cans for shipment to customers. At the filling station 626, each can may be filled with a beverage (or other substance) that corresponds to the decoration and/or other identifier (such as a barcode) that is printed on the can. After the cans are filled, a top, such as a lid having a stay-on tab, may be affixed to the flanged neck of the can. For example, edges of the lid and flanged neck may be crimped together, oftentimes with a sealant disposed therebetween to help seal the can. Prior to and/or during filling, the liquid may be pasteurized to kill bacteria within the can. This process may involve heating the liquid up to a temperature of at least 63° C. in some embodiments. In some embodiments, the pasteurization may include heating the liquid prior to dispensing the liquid into the cans. In other embodiments, once filled, the cans may be heated within a pasteurization oven to heat the liquid inside the cans to the necessary temperature. For example, heated water (such as water at 65° C.-80° C.) may be sprayed on the filled cans to heat the contents of the can. After the cans have reached the necessary temperature, the cans may be cooled prior to palletization, such as by spraying the cans with cool water. This cooling may help prevent the formation of condensation on the outside of the cans, which may damage cardboard used in the palletization/packing process.

Transportation of the cans/blanks between the various devices may be performed by different conveyor mechanisms 628 throughout the manufacturing process. The mechanism chosen for a given stage may depend on a number of lines of cans entering and/or exiting a given device, a desired throughput, a desired orientation of the cans entering and/or exiting a given device, a current state of the cans entering and/or exiting a given device, and/or other factors. Possible conveyor mechanisms may include conveyor belts, vacuum conveyors (such as vacuum bridges), chain conveyors, roller conveyors, chute conveyors, vertical conveyors, wheel conveyors, pneumatic conveyors, and/or other conveyor mechanisms. As noted above, the devices, systems, and method described herein may be used at any point on the production line 600, including at any of the conveyer mechanisms 628 described in relation to the production line 600.

The production line 600 may include any number of quality control stations (not shown) positioned at one or more locations along the production line 600. The quality control stations may check for defects within the cans and ensure that each can meets a required quality control standard. The quality control stations may include one or more sensors (such as imaging sensors, scales, coating thickness gauges, enamel raters, tension meters, and the like) that may be used to determine whether individual cans meet the quality control standards. For example, the sensors may detect a wall thickness of the cans, a dome depth, can weight, proper diameters of the cans, a can height, presence of varnish and/or lacquer, quality of decoration (possibly including a barcode and/or other identifier), presence of a bottom rim coating, packaging quality, and the like. The quality control stations may be positioned after a given operation (e.g., checking a thickness of varnish and/or lacquer immediately after application/curing) and/or may be positioned at a later stage of the production line 600. For example, in some embodiments one or more quality control stations may be positioned just prior to the palletizer 624, such that the sensors may detect any defects that have occurred during production prior to the cans being loaded onto a pallet for shipment to a customer and/or filling. Similarly, one or more quality control stations may be positioned along the filling station 626 to ensure that the cans meet quality control standards prior to, during, and/or after filling of the can.

Production line 600 may include one or more removal mechanisms (not shown) that may be positioned at one or more points along the production line 600. The removal mechanisms may be used to remove defective and/or otherwise imperfect cans from the production line 600. For example, if one of the quality control stations determines that a given can or group of cans does not meet a predetermined quality control standard, a removal mechanism may remove the can or group of cans from the production line 600. In some instances, only those cans that have been determined to not meet quality control standard may be removed, while in other embodiments a section of cans proximate the defective can or cans may also be removed. The removal of cans proximate a defective can may be particularly useful in some instances. For example, cans that are improperly oriented on a piece of equipment may lead to collateral damage to nearby otherwise good cans. The removal mechanisms may take many forms, such as air guns, vacuum bridges, mechanical arms, magnetic rejection system (for packaging materials that are ferromagnetic), and/or other known removal mechanisms.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed devices, systems, and methods have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

EXAMPLES

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the invention is not limited to these examples but rather encompass all possible modification and variations within the scope of the issues claims and their equivalents.

Example 1. A device for diverting one or more objects from a plurality of objects traveling on a conveyer mechanism, the device including: a diverting bar including a pivot end, a free end opposite the pivot end, and a body having a surface positioned between the pivot end and the free end such that the surface is configured to divert the one or more objects, wherein the body is positioned at least partially over the conveyer mechanism; and a counterweight operably coupled to the diverting bar, the counterweight configured to apply a biasing force against the one or more objects contacting the surface of the diverting bar.

Example 2. The device of any of the preceding or subsequent examples or combination of examples, wherein the pivot end is affixed to the conveyer mechanism Example 3. The device of any of the preceding or subsequent examples or combination of examples, wherein the counterweight is operably coupled to the body of the diverting bar with a cord such that vertical movement of the counterweight is translated to provide lateral movement of the diverting bar.

Example 4. The device of any of the preceding or subsequent examples or combination of examples, wherein a contact force applied by the one or more objects contacting the surface of the body causes vertical movement of the counterweight.

Example 5. The device of any of the preceding or subsequent examples or combination of examples, wherein the biasing force applied by the counterweight to the one or more objects contacting the surface of the diverting bar remains substantially consistent regardless of a change in magnitude of the contact force applied to the surface of the body by the one or more objects contacting the surface of the diverting bar.

Example 6. The device of any of the preceding or subsequent examples or combination of examples, wherein the one or more objects contacting the diverting bar comprises a first contacting object and a second contacting object, wherein the biasing force applied to the first contacting object and the biasing force applied to the second contacting object are different magnitudes.

Example 7. The device of any of the preceding or subsequent examples or combination of examples, wherein one or both of a pulley and a guide is used to translate the vertical movement of the diverting bar to provide lateral movement of the diverting bar.

Example 8. The device of any of the preceding or subsequent examples or combination of examples, wherein the diverting bar is further configured to direct the one or more objects contacting the surface of the body of the diverting bar towards a conveyer side opening.

Example 9. A device for identifying one or more objects from a plurality of objects, the device including: an object collector configured to accept an object from a conveyer mechanism, the object collector including a moveable surface configured to move between a first position that accepts the object and a second position that delivers the object; an object inspector including at least one imaging device configured to image at least one marking on the object; and a selection arm configured to accept the object from the object inspector, the selection arm further configured to either deliver the object to a target position or to deliver the object back to the conveyer mechanism, wherein the selection arm delivers the object to the target position or back to the conveyer mechanism.

Example 10. The device of any of the preceding or subsequent examples or combination of examples, wherein the object inspector makes a determination to direct the object to the target position or retain the object on the conveyer mechanism based on the at least one marking on the object, and the selection arm delivers the object to the target position or back to the conveyer mechanism responsive to the determination.

Example 11. The device of any of the preceding or subsequent examples or combination of examples, wherein the object collector further includes a slot in the moveable surface, the slot configured to accept the object.

Example 12. The device of any of the preceding or subsequent examples or combination of examples, wherein the slot of the moveable surface is adjacent an opening of the conveyer mechanism when the moveable surface is at the first position and the slot is configured to be positioned adjacent the object inspector when the moveable surface is at the second position.

Example 13. The device of any of the preceding or subsequent examples or combination of examples, wherein the object inspector is further configured to inspect the object for at least one marking as the object is positioned at the object collector.

Example 14. The device of any of the preceding or subsequent examples or combination of examples, wherein the object inspector additionally includes a carrier configured to accept the object from the object collector and to move the object relative to the at least one imaging device.

Example 15. The device of any of the preceding or subsequent examples or combination of examples, wherein the carrier is additionally configured as to deliver the object to the selection arm.

Example 16. A method for identifying an object, the method including: moving a plurality of objects in a first direction using a conveyer mechanism; diverting one or more objects from the plurality of objects moving on the conveyer mechanism; transferring an object from the plurality of objects from the conveyer mechanism to an object inspector, the object inspector including at least one imaging device; imaging at least one marking on the object using the at least one imaging device; and directing the object to a location based on the at least one imaged marking of the object.

Example 17. The method of any of the preceding or subsequent examples or combination of examples, wherein the at least one imaging device employs ultraviolet light or visible light to image the at least one marking.

Example 18. The method of any of the preceding or subsequent examples or combination of examples, wherein the at least one marking includes an embossed marking and/or an ultraviolet marking.

Example 19. The method of any of the preceding or subsequent examples or combination of examples, wherein an object collector is configured to transfer the object from the conveyer mechanism to the object inspector.

Example 20. The method of any of the preceding or subsequent examples or combination of examples, wherein the imaging the at least one marking further includes moving the object relative to the at least one imaging device.

Example 21. The method of any of the preceding or subsequent examples or combination of examples, wherein the directing includes transferring the object to a target position or transferring the object back to the conveyer mechanism.

Example 22. The method of any of the preceding or subsequent examples or combination of examples, further including inspecting the object at the target position for manufacturing defects.

Example 23. A system for identifying an object, the system including: a conveyer mechanism configured to move a plurality of objects in a first direction; a diverting bar comprising a pivot end, a free end opposite the pivot end, and a body having a surface positioned between the pivot end and the free end such that the surface is configured to divert one or more objects of the plurality of objects, wherein the body is positioned at least partially over the conveyer mechanism; a counterweight operably coupled to the diverting bar, the counterweight configured to apply a biasing force against the one or more objects contacting the surface of the diverting bar; an object collector configured to accept an object from the conveyer mechanism, the object collector including a moveable surface configured to move between a first position that accepts the object and a second position that delivers the object; an object inspector configured to inspect the object for at least one marking, the object inspector including at least one imaging device configured to image the at least one marking on the object; and a selection arm configured to either deliver the object to a target position or to deliver the object back to the conveyer mechanism, wherein the selection arm delivers the object to the target position or back to the conveyer mechanism based on the at least one marking of the object imaged by the object inspector.

The above description provides exemplary embodiments only, and is not intended to limit the scope, applicability, or configuration of the disclosure. Rather, the description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

What is claimed is:

1. A device for diverting one or more objects from a plurality of objects traveling on a conveyer mechanism, the device comprising:
    a diverting bar comprising a pivot end, a free end opposite the pivot end, and a body having a surface positioned between the pivot end and the free end such that the surface is configured to divert the one or more objects, wherein the body is positioned at least partially over the conveyer mechanism; and
    a counterweight operably coupled to the diverting bar, the counterweight configured to apply a biasing force against the one or more objects contacting the surface of the diverting bar, wherein the counterweight is operably coupled to the body of the diverting bar with a cord such that vertical movement of the counterweight is translated to provide lateral movement of the diverting bar.

2. The device of claim 1, wherein the pivot end is affixed to the conveyer mechanism.

3. The device of claim 1, wherein a contact force applied by the one or more objects contacting the surface of the body causes vertical movement of the counterweight.

4. The device of claim 3, wherein the biasing force applied by the counterweight to the one or more objects contacting the surface of the diverting bar remains substantially consistent regardless of a change in magnitude of the contact force applied to the surface of the body by the one or more objects contacting the surface of the diverting bar.

5. The device of claim 4, wherein the one or more objects contacting the diverting bar comprises a first contacting object and a second contacting object, wherein the biasing force applied to the first contacting object and the biasing force applied to the second contacting object are different magnitudes.

6. A device for identifying one or more objects from a plurality of objects, the device comprising:
    an object collector configured to accept an object from a conveyer mechanism, the object collector including a moveable surface configured to move between a first position that accepts the object and a second position that delivers the object;
    an object inspector including at least one imaging device configured to image at least one marking on the object; and
    a selection arm comprising:
        a clockwise-facing holding element; and
        a counter-clockwise-facing holding element, wherein:
            each of the clockwise-facing holding element and the counter-clockwise-facing holding element is configured to accept the object from the object inspector, the selection arm further configured to either deliver the object to a target position or to deliver the object back to the conveyer mechanism via the clockwise-facing holding element or the counter-clockwise-facing holding element.

7. The device of claim 6, wherein the object inspector makes a determination to direct the object to the target position or retain the object on the conveyer mechanism based on the at least one marking on the object, and the selection arm delivers the object to the target position or back to the conveyer mechanism responsive to the determination.

8. The device of claim 6, wherein the object collector further includes a slot in the moveable surface, the slot configured to accept the object.

9. The device of claim 8, wherein the slot of the moveable surface is adjacent an opening of the conveyer mechanism when the moveable surface is at the first position and the slot is configured to be positioned adjacent the object inspector when the moveable surface is at the second position.

10. The device of claim 8, wherein the object inspector is further configured to inspect the object for at least one marking as the object is positioned at the object collector.

11. The device of claim 8, wherein the object inspector additionally includes a carrier configured to accept the object from the object collector and to move the object relative to the at least one imaging device.

12. The device of claim 11, wherein the carrier is additionally configured as to deliver the object to the selection arm.

13. A method for identifying an object, the method comprising:

moving a plurality of objects in a first direction using a conveyer mechanism;

diverting one or more objects from the plurality of objects moving on the conveyer mechanism;

transferring an object from the plurality of objects from the conveyer mechanism to an object inspector, the object inspector including at least one imaging device;

imaging at least one marking on the object using the at least one imaging device; and directing the object to a location based on the at least one imaged marking of the object using a clockwise-facing holding element or a counter-clockwise-facing holding element of a selection arm, wherein use of the clockwise-facing holding element or the counter-clockwise-facing holding element is determined based on the location.

14. A system for identifying an object, the system comprising:

a conveyer mechanism configured to move a plurality of objects in a first direction;

a diverting bar comprising a pivot end, a free end opposite the pivot end, and a body having a surface positioned between the pivot end and the free end such that the surface is configured to divert one or more objects of the plurality of objects, wherein the body is positioned at least partially over the conveyer mechanism;

a counterweight operably coupled to the diverting bar, the counterweight configured to apply a biasing force against the one or more objects contacting the surface of the diverting bar;

an object collector configured to accept an object from the conveyer mechanism, the object collector including a moveable surface configured to move between a first position that accepts the object and a second position that delivers the object;

an object inspector configured to inspect the object for at least one marking, the object inspector including at least one imaging device configured to image the at least one marking on the object; and a selection arm configured to either deliver the object to a target position or to deliver the object back to the conveyer mechanism, wherein the selection arm delivers the object to the target position or back to the conveyer mechanism based on the at least one marking of the object imaged by the object inspector.

* * * * *